United States Patent [19]

Armitage, Jr. et al.

[11] 4,260,249

[45] Apr. 7, 1981

[54] TWO SLIT ILLUMINATION APERTURE

[75] Inventors: John D. Armitage, Jr., Longmont, Colo.; Wilson M. Routt, Jr., Lexington, Ky.

[73] Assignee: International Business Machines, Armonk, N.Y.

[21] Appl. No.: 75,926

[22] Filed: Sep. 17, 1979

[51] Int. Cl.³ ........................ G03B 27/54; G03B 27/70

[52] U.S. Cl. .......................................... 355/67; 355/57

[58] Field of Search ..................... 355/67 S, 71, 67, 8, 355/11, 49, 51, 52, 55, 56, 57, 60, 66

[56] References Cited

U.S. PATENT DOCUMENTS

| | | | |
|---|---|---|---|
| 3,609,037 | 9/1971 | Suzuki | 355/66 |
| 3,709,602 | 1/1973 | Satomi | 355/57 X |
| 3,830,591 | 8/1974 | Albrecht | 355/71 |
| 3,961,847 | 6/1976 | Turner et al. | 355/8 X |
| 3,967,894 | 7/1976 | Tsilibes | 355/67 X |
| 4,057,342 | 11/1977 | Allis | 355/8 |
| 4,090,788 | 5/1978 | Massengeil | 355/8 X |

FOREIGN PATENT DOCUMENTS

| | | | |
|---|---|---|---|
| 975090 | 10/1950 | France | 355/52 |

*Primary Examiner*—Donald A. Griffin
*Attorney, Agent, or Firm*—Charles E. Rohrer

[57] ABSTRACT

A three piece aperture comprising a centerpiece positioned much as an "island" between two outer pieces so as to form two light transmissive slits. The two outer pieces may contain symmetrical light transmission edges. The aperture is of particular use in electrophotographic copier machines where substantially continuously variable reduction is practiced.

8 Claims, 4 Drawing Figures

TWO SLIT ILLUMINATION APERTURE

This invention relates to illumination shaping apertures and more particularly to apertures suited for use with electrophotographic document copier machines.

RELATED PATENT APPLICATION

U.S. Patent Application Ser. No. 050,849, filed June 21, 1979, which relates to the shaping of illumination in a document copier machine over a range of reduction ratios by utilizing a single fixed aperture.

BACKGROUND OF THE INVENTION

Contemporaneous with the commercialization of electrostatic copiers, there has been a desire to increase the capability of the copier machine without, at the same time, degrading its performance. One particularly desirable feature which has been introduced is the capability of reducing the image size in relation to the size of the original document. The advent of copiers capable of this reducing function required the solution of several problems, i.e., those particularly caused by changes induced as a result of the changes in the optical configuration required to reduce the image. While the solution of these problems in a laboratory environment may be trivial, the constraints imposed by the commercialization of these devices made the solution of these problems more difficult. In particular, the commercial device capable of reduction must exhibit the same image sharpness and consistency of image exposure as a nonreduction machine with desirably little or no increase in equipment size, cost or maintenance difficulty.

While a copier capable of reducing an image to a particular ratio satisfies more of the user's needs than a machine which is not so capable, it is also desirable to increase the number of reduction modes and finally to provide for continuously variable reduction within some specified range of reduction modes. In connection with this description, a reduction mode is defined as a machine configuration to produce a specified reduction ratio, not equal to 1. As the number of reduction modes is increased until it becomes essentially continuous, the number of optical problems to be solved increase, and with the constraints imposed on commercial devices, the difficulty in solving these problems increases.

Desirably, the image produced by a copier is uniform in exposure, and the achievement of this uniformity requires careful design. For example, the presence of a lens in the optical path results in image irradiance reduction for that portion of the image passing through the lens off the optical center line, i.e., so-called $\cos^4$ losses. In the piror art, solutions to this difficulty have been achieved by shaping the object irradiance so as to compensate for these lens effects and similar shaping has been used to compensate for otherwise uneven object irradiance.

However, the introduction of a reduction capability caused further variations in the image exposure since, as reduction is introduced, image irradiance at the image plane increases. The variations in exposure in a machine which included a single reduction mode (i.e., a reduction ratio other than 1) had been compensated for in the prior art by adding an aperture only in the reduction mode to limit image exposure in that mode. This aperture, mask or light stop, could theoretically be located either adjacent the image plane or adjacent the object plane, and in the case of its location near the object plane, it could be located between the source of irradiance and the object or between the object and the lens.

Compounding the problem is the fact that an elongated light source produces more light toward the center of the source than at the edges and the additional fact that light rays are received with more irradiance at the center of a curved drum surface than at the edges.

A further complication arises in some machines which are capable of reduction by reason of the relationship between the center line of objects of different size. In one group of machines, the center line is not changed, i.e., the objects are center-referenced; obviously, this causes no additional difficulties. However, in another group of machines, the objects to be copied are corner-referenced, and as a result, as the object to be copied increases in size, and the reduction mode is correspondingly changed, the center line moves or changes in position relative to the center line of a smaller object to be copied. This "corner-referencing" serves to increase the difficulties associated with $\cos^4$ losses and other irradiance distortions, since more of the image to be reproduced falls in the edge where image exposure is reduced without some special attention.

In machines capable of a given small number of reduction modes, image exposure variations, in the prior art, were handled by arranging the exposure in a base mode to be relatively uniform, and then substituting a different mask, light stop or aperture, for each different mode to maintain the uniformity of exposure. However, as can be realized, when the number of reduction modes is increased to such a point that the reduction capability is essentially continuous the requirement to provide different masks, light stops or apertures, for each reduction mode, renders the system unmanageable in terms of equipment size, cost or maintainability. Accordingly, there has been a desire for achieving the capability of essentially continuously variable reduction, while maintaining image exposure relatively constant in a simple and inexpensive manner.

A system capable of achieving some of these goals is shown in Allis U.S. Pat. No. 4,057,342, issued on Nov. 8, 1977. This patent discloses a copying system with a pair of apertures (light stops, masks, slits, etc.) located in the optical path and capable of operating in a base mode and a reduction mode. The patentee recognized that additional reduction modes could be employed and, while image exposure variations would occur, the exposure system would provide a degree of correction. The patentee also indicates, however, that a slit appropriate for a base mode or nonreduction mode of operation would probably not be adequate for reduction mode of operation and correspondingly, a slit provided for uniform illumination in a reduction mode of operation would not provide proper operation in a base or nonreduction mode or in a different reduction mode.

It is an object of the present invention to provide a stationary aperture, mask or slit for exposure control which is applicable not only to a nonreduction mode of operation but also applicable to continuous reduction modes of operation. It is a further object to make the aperture symmetrical thus greatly relaxing the manufacturing and alignment tolerance requirements associated with prior art nonsymmetrical apertures.

SUMMARY OF THE INVENTION

The present invention relates to placing a centerpiece within the borders of an aperture so that the aperture in effect becomes a three piece unit thereby enabling the adjustment of only the centerpiece to accurately correct exposure. In that manner, two slits are created on each side of the center "island" such that if lateral misalignment occurs the increase in light through one slit will be largely cancelled by the decrease in light through the other, thereby maintaining the desired aperture effect independent of the mispositioning. Additionally, the edges of the two outer pieces may be made symmetrical to each other thereby greatly reducing the cost of aperture assembly. The invention is of particular use in an electrophotographic machine where the aperture may take the form of a mask, positioned upon a mirror in the optical path between the document and the image plane.

BRIEF DESCRIPTION OF THE DRAWINGS

The above-mentioned and other features and objects of this invention and the manner of attaining them will become more apparent and the invention itself will be best understood by reference to the following description of embodiments of the invention taken in conjunction with the accompanying drawings the description of which follows.

DETAILED DESCRIPTION

Figure 1:
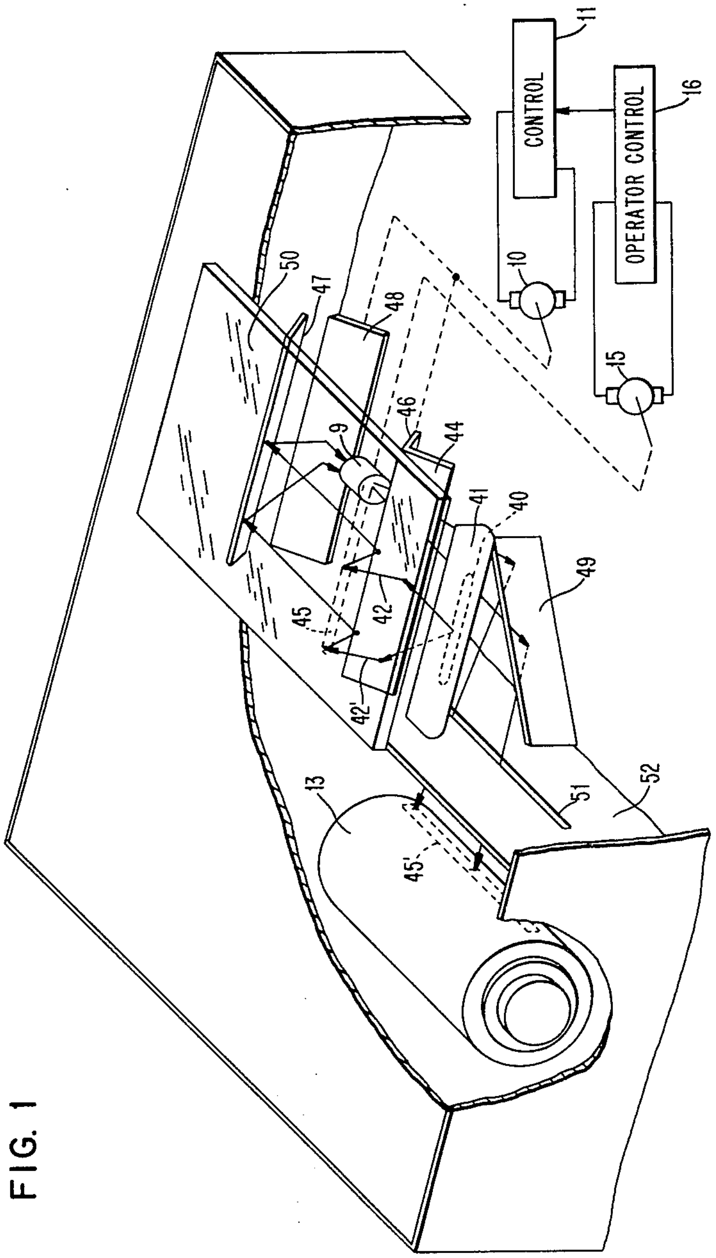
FIG. 1 is a diagrammatic drawing showing an electrophotographic copier machine broken away to show the essential components of the optical system.

A preferred embodiment of the invention is illustrated in the accompanying drawings, in connection with an essentially continuously variable reduction copying machine which can be of the type which is disclosed in U.S. Pat. No. 4,209,248, issued June 24, 1980. FIG. 1 is a showing of the essential components of the copying machine in schematic fashion. FIG. 1 shows a transparent platen or document support 50 arranged to support a document to be copied. Light for the copying process is provided by the lamp 40 and reflectors 41 and 44 are provided to reflect the light to the support surface 50. Light source 40, eliptical reflector 41 and dichroic reflector 44 are arranged so that the irradiation on the document support describes a focused line of light 45. Light rays reflected from the object to be copied are passed to a mirror 46 and from there to mirrors 47 and 48. Representative light rays 42 and 42' are shown in FIG. 1 tracing the light path from the source 40 through the respective equipment just mentioned. These light rays are reflected from the mirror 48 through a lens 9, reflected by a further mirror 49, pass through a slit 51 in wall 52 of the machine and finally imping upon the surface of photoreceptive drum 13. Thus the image of the line of light 45 is reproduced on the surface of the drum 13 as a line of light 45'. In order to reproduce the image of an entire document, a first carriage supporting the light source 40, reflector 41 and mirrors 44 and 46, and a second carriage supporting mirrors 47 and 48 are translated parallel to the longer dimension of platen 50. As the carriages are translated, the line of light 45 scans the document to be copied and produces a corresponding image on the surface of the drum 13 as that drum rotates.

As is well known to those skilled in the art a latent image of the object to be copied is produced on the drum 13 and this latent image is later transferred to copy paper so that the image which the objects bears is reproduced on the copy paper.

As disclosed in Patent Application Ser. No. 721,125, reduction is achieved by selectively positioning the lens 9 and appropriately controlling the scanning of the first and second carriages in conjunction with the motion of the drum 13. The apparatus to position lens 9 is schematically shown in FIG. 1 as comprising a motor 15 operated under operator control 16. Motion of the first and second carriages is controlled by a motor 10 under the control of control apparatus 11.

For each discrete position of the lens 9 within its intended operating range, the electrophotographic copying machine shown in FIG. 1 achieves a unique reduction ratio and thus the machine is capable of a range of reduction ratios or reduction modes within the range of movement of the lens 9. In a preferred embodiment of the invention, the machine is capable of reducing modes in the range of 1:1 to 1:K where K is 0.647.

Figure 2:
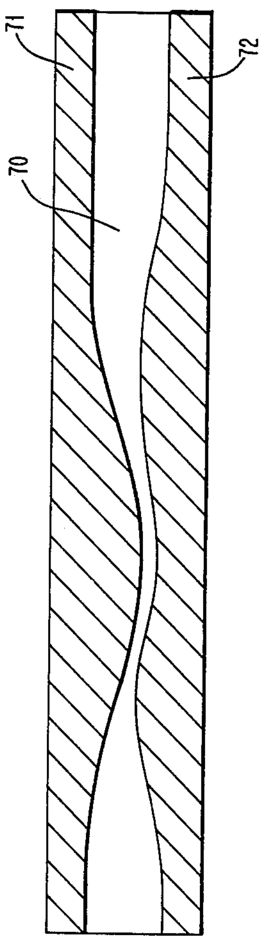
FIG. 2 (PRIOR ART)
FIG. 2 shows an aperture as it exists in the prior art.

FIG. 2 is illustrative of the type of aperturing arrangement which has been used in the prior art. It is of an essentially "dogbone" shaped design with the aperture 70 shown between masking portions 71 and 72. The unusual shape of the particular aperture shown in FIG. 2 is due to the need to obtain uniform exposure by correcting problems such as corner-referencing of the document, the $\cos^4$ effect, and the roll off of light towards the edges of an elongated bulb. In particular, the asymmetrical shape of the aperture is required to obtain uniform exposure over a wide range of reduction modes.

Figure 3:
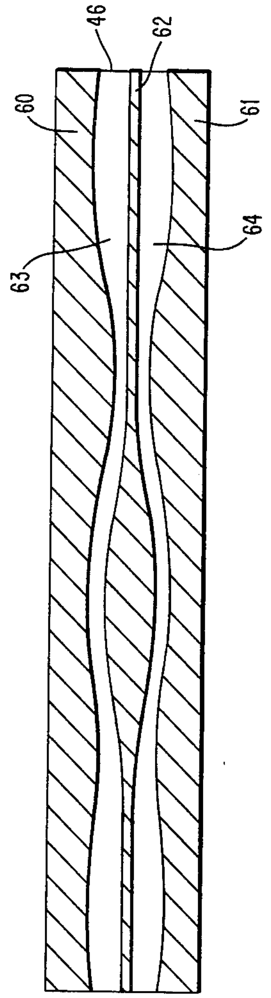
FIG. 3 shows the aperture of this invention.

FIG. 3 illustrates the aperture of this invention where the profile of light produced through the aperture of FIG. 2 has been achieved even though the aperture parts 60 and 61 are symmetrical to each other. This result has been achieved through the use of a centerpiece or so-called "island" piece 62 shown situated between edge pieces 60 and 61. Thus, with four edges, the edge pieces 60 and 61 can be made symmetrical and positioned on a surface such as mirror 46 in the optical path of the machine shown in FIG. 1. The positioning of pieces 60 and 61 can be performed without regard to careful adjustment contrary to the need for carefully adjusting the pieces 71 and 72 in the prior art configuration. The adjustment for achieving proper illuminating exposure in the arrangement shown in FIG. 3 is achieved simply by carefully positioning the island piece 62. Note that the three piece arrangement provides a two slit illumination aperture. One slit 63 being situated between edge piece 60 and the island piece 62, while the second slit 64 is located between edge 61 and the island piece 62. By creating a two slit aperture, the island piece 62 can be positioned close to the piece 60 or further away from the piece 60 and toward the piece 61 without destroying the amount of illumination which passes through the aperture from an object towards an image plane. This is because such misalignment increases the light through the aperture slit 63 while decreasing the light through aperture slit 64. Since these changes largely cancel one another, the desired aperturing effect is maintained.

Figure 4:
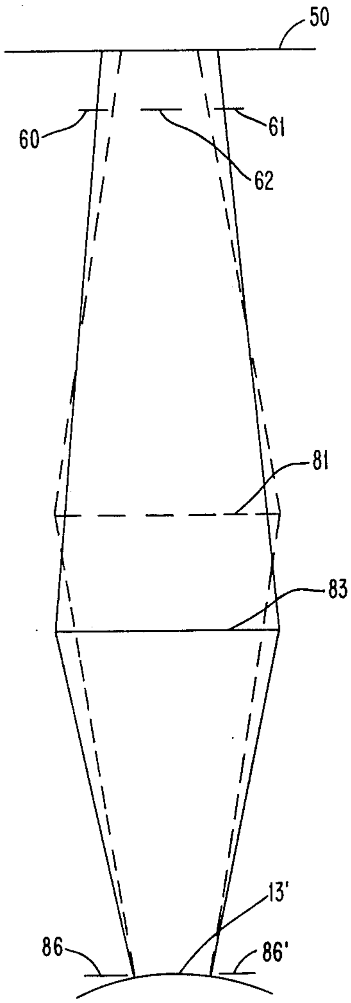
FIG. 4 shows the cone of collected light for minimum and maximum reduction ratios.

It should be noted that since the edge piece 60 is symmetrical to the edge piece 61, there is a significant relaxing in the manufacturing and alignment tolerance requirements over the prior art aperture shown in FIG. 2. This is especially important where the aperture is designed to accurately correct for all magnifications. FIG. 4 shows the collection of a cone 80 of light rays reflected from a document placed on glass platen 50 at a minimum reduction ratio, for example, 1:1. The lens 9 is positioned at 81 to collect these rays and send them to the image plane 13'. FIG. 4 also shows a cone 82 of light rays reflected at a maximum reduction, for example, 1:0.647, through lens 9 positioned at 83 to image plane 13'. As can be seen from FIG. 4, the cones of collected light are different for the two magnification modes. Note that at the aperture location, the cone 82 corresponding to the 1:0.647 mode is larger than the cone 80 corresponding to 1:1 mode. As a result, the light transmitted through cone 82 can be strongly affected by the edge pieces 60 and 61. Since these pieces do not extend into cone 80, they do not shape irradiance at the 1:1 mode. Note also that centerpiece 62 blocks proportionately more light in the 1:1 mode than in the 1:0.647 mode, causing piece 62 to have maximum effect at the higher ratios, while edge pieces 60 and 61 have maximum effect at the lower ratios. As a consequence, the three piece aperture of this invention combines these two effects to allow some decoupling of aperture requirements between 1:1 and other modes. Depending upon the relative dimensions of the cone and aperture width at the aperture plane, design requirements may allow for uniform exposure at 1:1 by properly shaping only centerpiece 62 while proper shaping of edge pieces 60 and 61 allows improved uniformity at 1:0.647 mode. The design process is iterative and converges to an optimum three piece combination for improved uniformity throughout the reduction range. FIG. 4 also shows a stray light aperture 86 and 86' located near the image plane 13'.

Thus, there has been provided a three piece aperture for improved tolerance sensitivity in uniform image irradiance throughout a range of reduction ratios. Symmetry of the edge pieces can be included as a design requirement to reduce alignment sensitivity but may cost some reduction in nominal performance.

While the invention has been particularly shown and described with reference to a preferred embodiment thereof, it will be understood by those skilled in the art that the foregoing and other change in form and details may be made therein without departing from the spirit and scope of the invention.

What is claimed:

1. An electrophotographic machine comprising:

a document platen for holding a document to be copied;

a photoreceptive surface with an exposure area for receiving an image of said document;

a light source;

light reflecting and transmissive means to form a light path and cause light from said source to carry an image of said document to said photoreceptive surface; and aperture means in said light path to shape the profile of said light so that said photoreceptive surface receives substantially constant exposure across said area, said aperture means comprising three pieces, a centerpiece placed between two outer pieces so as to form two variable width light transmitting slits.

2. The machine of claim 1 wherein said two outer pieces contain symmetrical light profile shaping edges.

3. The machine of claim 2 wherein said aperture is placed in said light path between the document to be copied and the image.

4. The machine of claim 3 wherein said aperture is placed adjacent to a light reflecting surface.

5. The machine of claim 4 wherein said light reflecting and transmission means includes a lens and the machine is capable of continuously variable reduction.

6. The machine of claim 1 wherein said aperture is placed in said light path between the document to be copied and the image.

7. The machine of claim 6 wherein said aperture is placed adjacent to a light reflecting surface.

8. The machine of claim 7 wherein said light reflecting and transmission means includes a lens and the machine is capable of continuously variable reduction.

* * * * *